(12) United States Patent
Wu et al.

(10) Patent No.: US 12,436,027 B2
(45) Date of Patent: Oct. 7, 2025

(54) MODULAR STRAY LIGHT MITIGATION

(71) Applicant: Eagle Technology, LLC., Melbourne, FL (US)

(72) Inventors: Gordon Chun Kong Wu, Melbourne, FL (US); Nicholas Piekiel, Rochester, NY (US); John Osborn, Spencerport, NY (US); Kenneth Patterson, Rochester, NY (US); Brian Hart, Rochester, NY (US); Peter Bickford, Rochester, NY (US)

(73) Assignee: Eagle Technology, LLC, Melbourne, FL (US)

( * ) Notice: Subject to any disclaimer, the term of this patent is extended or adjusted under 35 U.S.C. 154(b) by 512 days.

(21) Appl. No.: 17/963,148

(22) Filed: Oct. 10, 2022

(65) Prior Publication Data

US 2024/0118134 A1 Apr. 11, 2024

(51) Int. Cl.
*G01J 1/04* (2006.01)
*G02B 5/00* (2006.01)

(52) U.S. Cl.
CPC ............ *G01J 1/0437* (2013.01); *G02B 5/003* (2013.01); *G02B 2207/101* (2013.01)

(58) Field of Classification Search
CPC .. G01J 1/0437; G02B 2207/101; G02B 5/003
USPC ........................................................ 356/225
See application file for complete search history.

(56) References Cited

U.S. PATENT DOCUMENTS

| | | | |
|---|---|---|---|
| 6,538,736 B1 | 3/2003 | Palumbo | |
| 7,247,852 B2 | 7/2007 | Jenkins | |
| 7,926,961 B2 | 4/2011 | Shaw et al. | |
| 8,963,068 B2 | 2/2015 | Hagopian et al. | |
| 9,039,210 B2 | 5/2015 | Longerich et al. | |
| 9,823,459 B2 | 11/2017 | Bullard et al. | |
| 10,338,371 B1 | 7/2019 | Morrison | |

(Continued)

FOREIGN PATENT DOCUMENTS

| CN | 202443173 U | 9/2012 |
|---|---|---|
| CN | 208588848 U | 3/2019 |

(Continued)

OTHER PUBLICATIONS

A. Yevtushenko, A. von Finck, D. Katsir, H. Shfaram, Angela Duparré, "Vane-free design for star trackers and telescopes," Proc. SPIE 10562, International Conference on Space Optics—ICSO 2016, 1056215 (Sep. 25, 2017).

(Continued)

*Primary Examiner* — Sunghee Y Gray
(74) *Attorney, Agent, or Firm* — Fox Rothschild LLP; Carol E. Thorstad-Forsyth

(57) ABSTRACT

Stray light in a metering structure is controlled by surrounding with a rigid shield an elongated length of a strut and supporting on the rigid shield a surface finish which is highly absorptive of light. The strut is thermally decoupled from the rigid shield using a plurality of insulating web layers comprising a multi-layer insulation (MLI) system disposed between the strut and the rigid shield. The MLI in such scenarios (1) thermally isolates the strut from the shield (2) serves as a support structure to support the rigid shield on the strut, and (3) absorbs thermally induced mechanical stresses as between the rigid shield and the strut.

16 Claims, 10 Drawing Sheets

(56) References Cited

U.S. PATENT DOCUMENTS 10,788,663 B2    9/2020  Benezra
2006/0255275 A1  11/2006 Garman et al.

FOREIGN PATENT DOCUMENTS

| CN | 106597624 B | 5/2020 | |
|---|---|---|---|
| CN | 215584104 U | 1/2022 | |
| DE | 102006018743 A1 | 10/2007 | |
| FR | 3090135 A1 | 6/2020 | |
| JP | 2017513074 A | 5/2017 | |
| WO | WO-2022019264 A1 * | 1/2022 | ............. B32B 15/01 |

OTHER PUBLICATIONS

Hagopian, J. et al. "Carbon Nanotubes on Titanium Substrates for Stray Light Suppression" NASA Tech Briefs, Apr. 1, 2011.
Katsir, D. Stray Light Reduction in Industrial Optics, Mar. 11, 2021.
NPL—Waddell, P. "Telescope Stray Light Fundamental Optical Plumning and Early Experience" with SOFIA Science Center, Feb. 15, 2017.

* cited by examiner

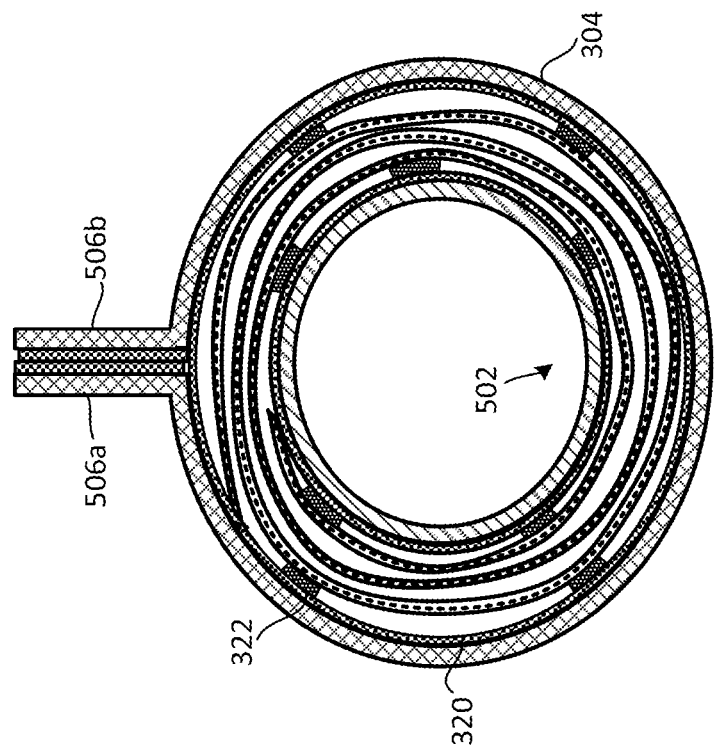
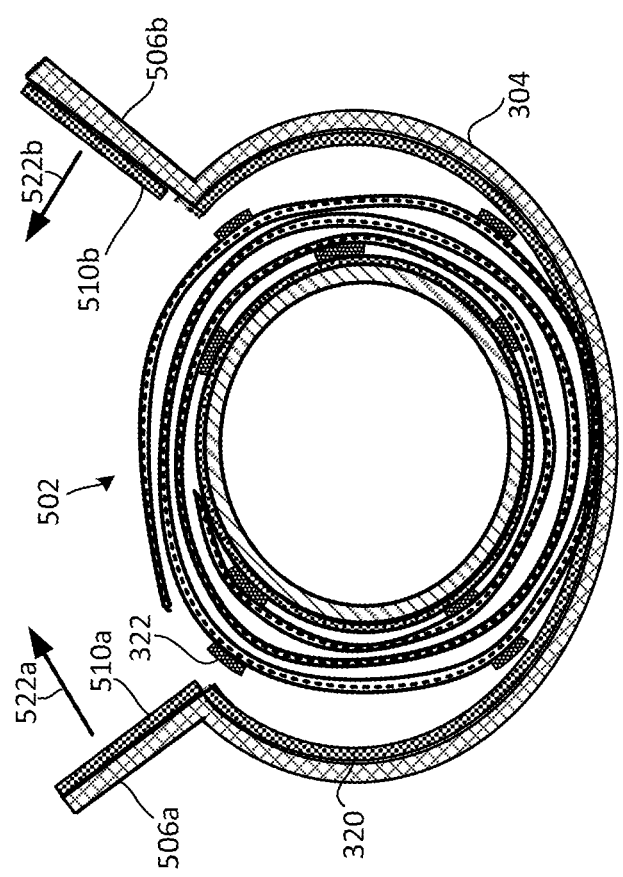
FIG. 5H
FIG. 5G

MODULAR STRAY LIGHT MITIGATION

BACKGROUND

Statement of the Technical Field

The technical field of this disclosure concerns systems for mitigating stray light, and more particularly modular systems which facilitate mitigation of stray light in optical systems.

Description of the Related Art

Metering structures are used in certain types of sensors, such as optical sensors, to precisely control spacings and orientations of elements which comprise the sensor system. For example, in a telescope type optical sensor a metering structure may be used to control a spacing and orientation of a primary mirror and a secondary mirror which form the telescope. The metering structure can be formed in various ways but will often include one or more elongated struts or rigid members to support the sensor elements.

A design consideration relating to metering structures involves management of stray light. Stray light which originates from bright objects near a telescope field of view (FOV) can be a significant noise source when attempting to acquire faint images. Consequently, the presence of stray light can limit mission operations and on-orbit observation efficiency. The stray light problem is particularly problematic when making observations involving a dimly lit subject while in the presence of a nearby stray light source. Various techniques have been proposed for minimizing stray light in a metering structure.

Problems with stray light in metering structures are sometimes only discovered late in the design process. Problems with stray light can also be encountered with existing designs. Both scenarios can result in the necessity of significant re-design work to reduce or eliminate the stray light.

SUMMARY

A method for mitigating stray light in an optical metering system is disclosed. The method involves disposing a plurality of web layers of a multi-layer insulation (MLI) system around an elongated length of a strut of an optical metering system to form an insulated strut assembly. The plurality of web layers of the MLI system can be advantageously disposed so that they extend substantially coextensive with the shield length. The MLI system is secured to the strut using a plurality of first fasteners. For example, the plurality of first fasteners can be disposed at a plurality of spaced apart locations along the elongated length of the strut. The insulated strut assembly is enclosed along the elongated length of the strut with a shield formed of a semi-rigid material. The shield can advantageously have a shield length that is substantially coextensive with the elongated length of the strut. The shield is secured to the MLI system using a plurality of second fasteners. According to one aspect, the plurality of first fasteners can be a first fastener type selected from the group consisting of an adhesive, a clip, a double sided tape, and a touch fastener. The plurality of second fasteners can be of a second fastener type also selected from the group consisting of an adhesive, a clip, a double sided tape, and a touch fastener. In some scenarios, the first and second fastener types which are selected can be the same.

The first fasteners, the second fasteners, and the MLI can advantageously facilitate an allowable dynamic dimensional variation of the strut relative to the shield caused by a coefficient of thermal expansion (CTE) mismatch as between the shield and the strut. For example, in some scenarios, one or more of the first fasteners, the second fasteners, and the MLI can be used to absorb mechanical stresses caused by a dynamic dimensional variation of the shield relative to the strut.

In some scenarios, a cross-sectional profile shape of the shield can be the same or a different shape as compared to a cross-sectional profile shape of the strut. For example, the cross-sectional profile shape of the shield can be chosen to facilitate a reduced amount of reflected stray electromagnetic radiation in the optical spectrum as compared to the cross-sectional profile shape of the strut.

According to one aspect, the shield can be comprised of a tubular member having a slit extending along the shield length between two opposing shield wall edges, and the method further comprises separating the opposing shield wall edges along the slit to form a gap. In such scenarios, the shield can be positioned around the strut by flexing the tubular member to increase the size of the gap, passing the strut through the gap and then closing the gap. After the gap has been closed, at least a third fastener can be used to secure a first one of the shield wall edges to a second one of the shield wall edges opposed from the first shield wall edge. The third fastener can be configured to maintain the gap in a closed state.

In other embodiments, the shield can be comprised of a tubular member formed of a plurality of shield members which divide the shield along the shield length. In such embodiments the method can further comprise enclosing the strut along the shield length by positioning at least a first one of the shield members along a first side of the strut, positioning at least a second one of the shield members along a second side of the strut, and securing the first one of the shield members to at least the second of the shield members.

In various embodiments disclosed herein, the shield is provided with a surface finish that is highly absorptive of electromagnetic radiation in the optical spectrum and disposed on an exterior surface of the shield along the shield length. For example, in some scenarios the surface finish can be a coating comprised of carbon nanotubes. According to a further aspect, a surface structure can be formed on an outer surface of the shield which is configured to reduce reflections of stray electromagnetic radiation in the optical spectrum.

Embodiments also include a method for controlling stray light in a metering structure. The method can include surrounding with a rigid shield an elongated length of a strut included in a metering structure and supporting on the rigid shield a surface finish which is highly absorptive of electromagnetic energy within the optical spectrum. The method also includes thermally decoupling the strut from the rigid shield using a plurality of insulating web layers comprising a multi-layer insulation (MLI) system disposed between the strut and the rigid shield. The MLI is also used as a support element to support the shield on the strut. When employed in this way, the MLI can concurrently (1) thermally isolate the strut from the shield (2) serve as a support structure to support the rigid shield on the strut, and (3) absorb thermally induced mechanical stresses which may arise as between the rigid shield and the strut.

BRIEF DESCRIPTION OF THE DRAWINGS

This disclosure is facilitated by reference to the following drawing figures, in which like reference numerals represent like parts and assemblies throughout the several views. The drawings are not to scale and are intended for use in conjunction with the explanations in the following detailed description.

FIGS. 5A-5H are a series of drawings which are useful for understanding a method for reducing the negative effects of stray light in a metering structure.

DETAILED DESCRIPTION

Figure 1A:
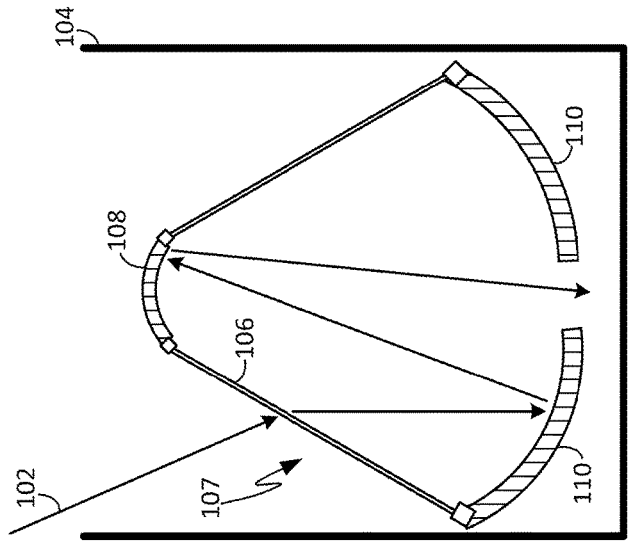
FIGS. 1A-1B (collectively referred to as FIG. 1) are a series of drawings that are useful for understanding the problem of stray light in an optical sensor platform.

It will be readily understood that the solution described herein and illustrated in the appended figures could involve a wide variety of different configurations. Thus, the following more detailed description, as represented in the figures, is not intended to limit the scope of the present disclosure but is merely representative of certain implementations in various different scenarios. Further, particular features described herein can be used in combination with other described features in each of the various possible combinations and permutations. It is noted that various features are described in detail with reference to the drawings, in which like reference numerals represent like parts and assemblies throughout the several views. While the various aspects are presented in the drawings, the drawings are not necessarily drawn to scale unless specifically indicated.

Figure 1B:
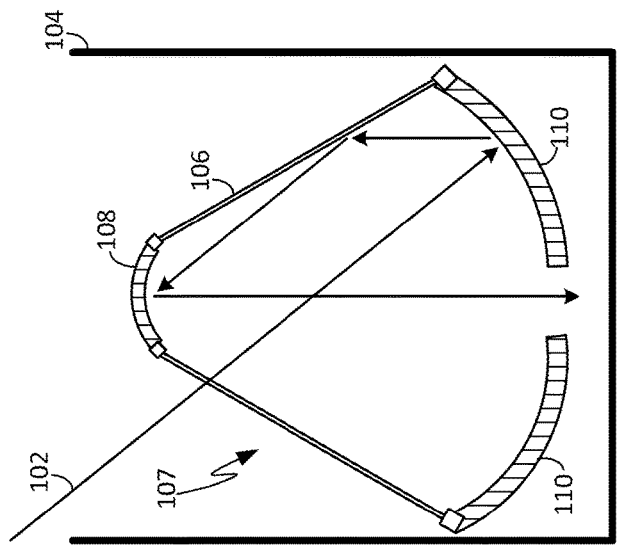
Figure 2A:
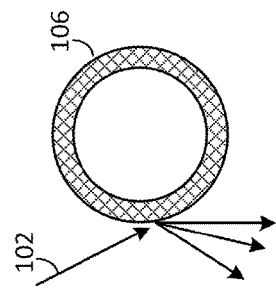
FIGS. 2A-2B (collectively referred to as FIG. 2) are a series of drawings that are useful for understanding how stray light can be reflected off of support elements which comprise a metering structure.
Figure 2B:
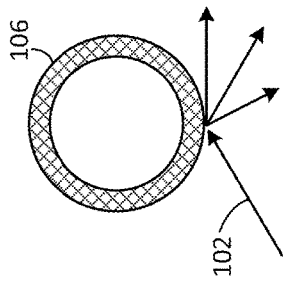

Stray light originating from bright objects near a field of view (FOV) of an optical sensing system is a significant noise source for imaging faint objects. As used herein, the term stray light refers to electromagnetic radiation within the optical spectrum that is unwanted and interferes with the performance or intended function of the optical system. Electromagnetic radiation in the optical spectrum can include light in the ultra-violet, visible and/or infrared range of the electromagnetic spectrum. In some scenarios, stray light can be caused by unwanted light which scatters and reflects off the metering structure of an optical system. Stray light reflecting from support struts of a metering structure and into a light path of the optical sensing system can be a large contributor for such optical noise. This is illustrated in FIGS. 1A and 1B which show how stray light 102 entering an optical sensor baffle 104 can be reflected off a strut 106 in a metering structure 107 supporting mirrors 108, 110. A cross-sectional view of optical struts 106 shown in FIGS. 2A and 2B, illustrate how stray light 102 can reflect from an underside of a strut or from a side of a strut to eventually travel into the optical path of a sensor.

High absorptance black paints can help reduce the occurrence of stray light. But use of such coatings can be a problem if multi-layer insulation (MLI) blankets are to be wrapped around struts for achieving thermal-optical stability. These highly flexible blankets are generally not suitable as carrier surfaces for the high absorptance (black) paints. Struts can also be formed with a cross-sectional shape which is optimized for reducing reflection of stray light into the path of the optical sensing system. However, MLI blankets used to achieve thermal-optical stability can partially obscure the cross-sectional shape so that it is less effective at reducing stray light. The resulting stray light problem can limit mission operations and on-orbit observation efficiency.

In a solution disclosed herein, a modular system and method for mitigating the occurrence of stray light is disclosed. The system and method can be useful in various optical systems including in metering structures used for optical sensor systems. Such a metering structure may be comprised of one or more rigid struts, each having an elongated length and configured to support an optical element in a position within the optical sensor system.

The solution involves using rigid or semi-rigid shields mounted on one or more struts or structural elements of an optical sensor system. In some scenarios, the solution can be applied to struts of a metering structure. The solution is described as modular insofar as it can be easily retrofit to existing optical system designs and/or added to new optical systems when a stray light problem is discovered late in the design process. Due to the various advantages of the modular system and method disclosed herein, required light mitigation can be added with minimal disruption or modification of the original system design. The system and method also facilitates opto-thermal stability of structural elements in an optical system.

The solution involves surrounding with a rigid or semi-rigid shield an elongated length of a strut included in the metering structure. The shield supports a surface finish which is highly absorptive of electromagnetic energy within the optical spectrum. The shield is thermally decoupled from the strut by a plurality of insulating web layers comprising a multi-layer insulation (MLI) system disposed between the strut and the rigid shield. Notably, the MLI serves a dual purpose as it is also used as a primary support structure to support the rigid shield on the strut. In this configuration, the MLI can absorb mechanical stresses caused by a coefficient of thermal expansion (CTE) mismatch between the rigid shield and the strut.

Figure 3:
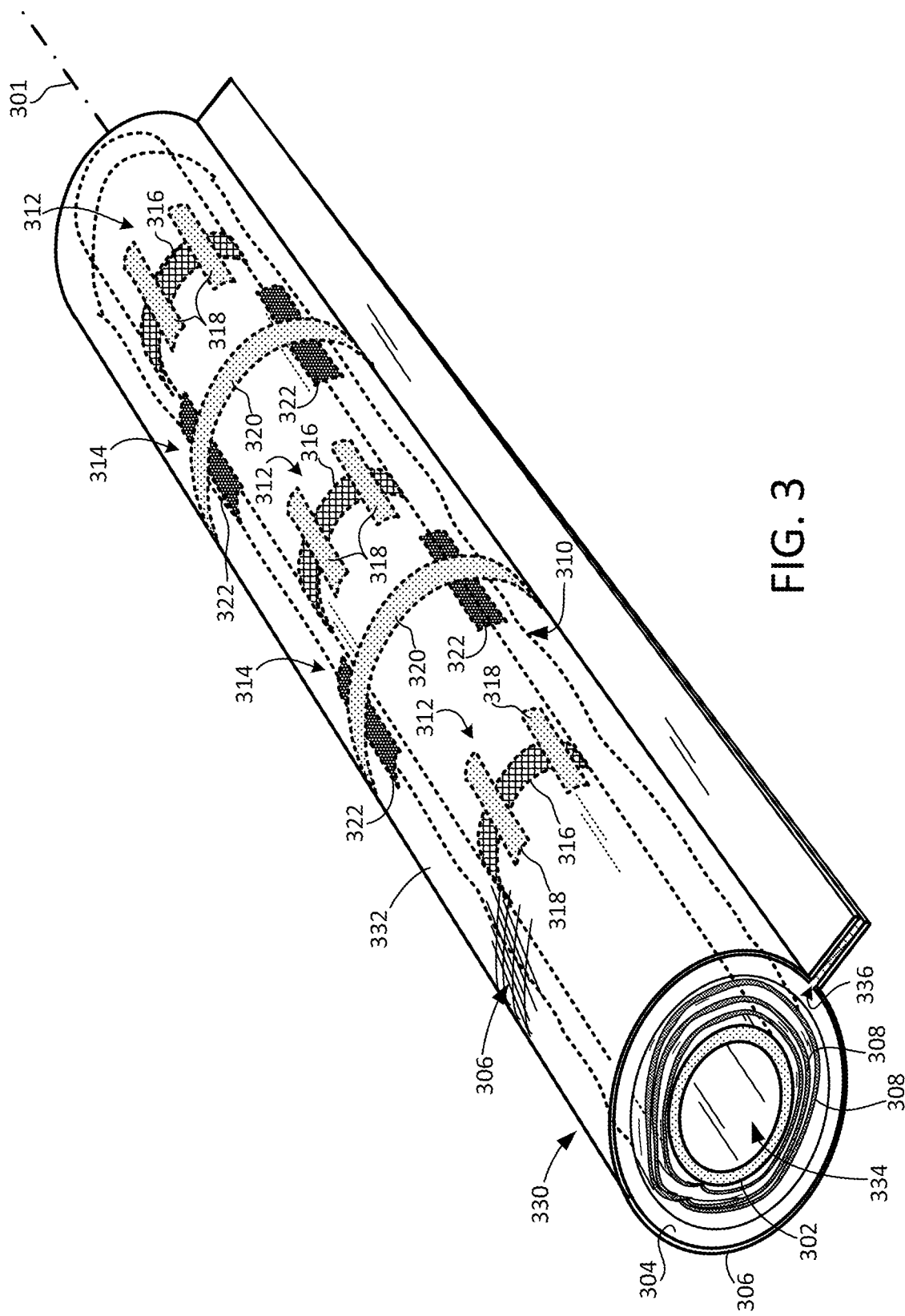
FIG. 3 is a drawing that is useful for understanding a modular stray light mitigation system including a semi-rigid shield mounted on a strut to reduce the negative effects of stray light in a metering structure.
Figure 4:
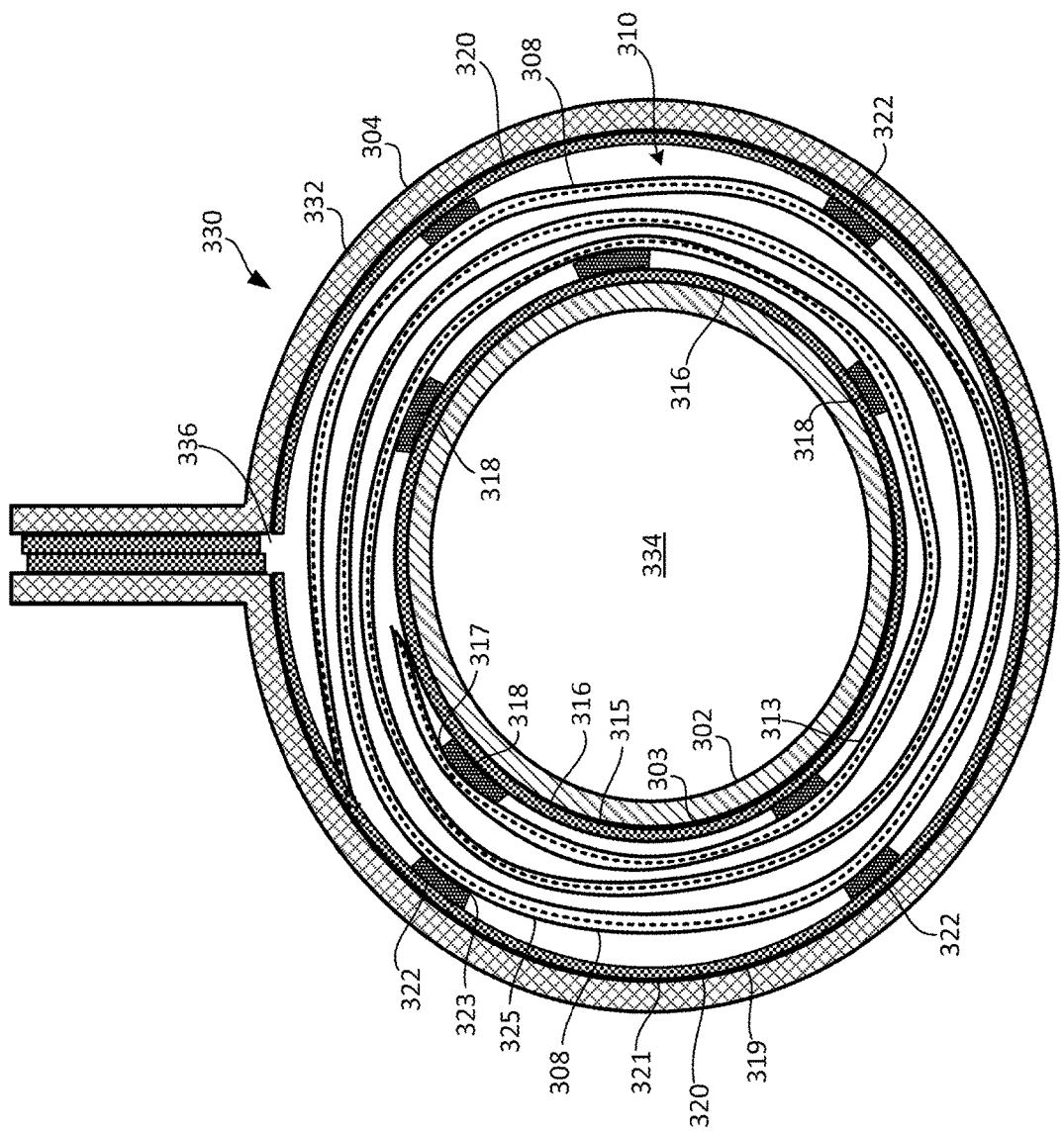
FIG. 4 is a drawing showing a cross-sectional view of the assembly of FIG. 3.

An example configuration is illustrated in FIGS. 3 and 4 which shows the system applied to facilitate stray light mitigation in relation for an elongated rigid strut 302. The elongated rigid strut 302 in this example may be one that is used to support an optical element in a metering structure. Only a single rigid strut 302 is shown in FIGS. 3 and 4, but it will be understood that a metering system can comprise a plurality of such rigid struts which form the structure of the metering system. A shield 304 surrounds the elongated length of the rigid strut 302. In this example, the strut and the shield are arranged so that an elongated length of each of these elements is coaxially aligned along a central axis 301. However, coaxial alignment of the strut and the shield is not necessary. In some scenarios, it may be advantageous to offset the alignment of a central axis associated with the shield as compared to the strut. The shield and the strut can each be formed of a light-weight composite material, a metal alloy or any other material suitable for the anticipated environmental conditions in which the optical sensor is to be deployed. In some scenarios, the shield can be open at opposing ends of its elongated length to allow a small portion of the strut to protrude. However, the solution is not limited in this regard and the ends of the shield can optionally be configured so as to completely enclose the rigid strut at the opposing ends thereof.

In some scenarios, the shield 304 can be a rigid structure or a semi-rigid structure. In certain embodiments disclosed herein, a degree of flexibility provided by the semi-rigid structure of the shield may be desirable to facilitate the modular features of the stray light mitigation system. The shield 304 can have one or more surface properties facilitated by a surface finish which causes the shield to be highly absorptive and/or minimize reflected electromagnetic radiation within the optical spectrum. In some scenarios, the surface finish on the shield can be facilitated by one or more material components which are integrated into a material comprising the rigid shield. For example, the surface properties can be facilitated by fillers, additives, compounds, and/or dyes which are added to a material forming the shield. The integrated materials can result in the rigid shield having a surface finish produced by the integral components which facilitates absorption of electromagnetic radiation in the optical spectrum. Alternatively, the material comprising the rigid shield can support a coating on its surface to facilitate a desired surface finish. A surface coating 306 which is used with the rigid shield can be comprised of a material that is highly absorptive of electromagnetic radiation in the optical spectrum.

For purposes of this disclosure, a surface finish that is highly absorptive can be understood to include those surface finishes which have an absorptance of at least 93%. In some scenarios, the surface finish can be highly absorptive of light in one or more of the visible, infrared and/or ultraviolet spectrum. In some scenarios, a material used to facilitate a desired surface finish can be one of a class of super-black coatings which have total hemispherical reflectance (THR) below 1.5% in the visible spectrum. An example of such a material is a line of products offered under the brand name Vantablack® by Surrey NanoSystems Limited of the United Kingdom. Vantablack® is available as coating of vertical tubes which are grown on a substrate using a modified chemical vapor deposition (CVD) process. It is also available as a sprayable paint that uses randomly aligned carbon nanotubes. These products facilitate very high levels of absorption of optical energy in the range from ultraviolet to the terahertz portion of the spectrum. The shield 304 provides the necessary rigid or semi-rigid support for the highly absorptive surface coating.

In some scenarios, the shield 304 can comprise a tubular structure 330 defined by an outer shield wall 332. A central lumen 334 extends the elongated length of the shield along the central axis 301. In some scenarios, the shield wall 332 can comprise a generally cylindrical structure as shown in FIGS. 3 and 4. However, as explained below in further detail, the solution is not limited in this regard and the shield 304 can also have other cross-sectional profiles. In some scenarios, the tubular structure 330 can include a slit 336 which extends longitudinally in alignment with the central axis along a length of the shield. The slit 336 can be defined by opposing edges of the shield wall.

In a solution disclosed herein, the strut 302 is thermally decoupled from the shield. For example, with reference to FIGS. 3 and 4 it can be observed that one or more insulating layers 308 can be disposed between the rigid strut and the rigid shield. According to one aspect, the one or more insulating layers can form a multi-layer insulation (MLI) system 310 to control transfer of thermal energy due to thermal radiation. In some scenarios, the one or more layers comprising the MLI can be formed of a thin sheet of polymer or plastic such as Mylar or Kapton. In some scenarios, the layers can have a thickness of about 6 μm but the solution is not limited in this regard. The layers of the MLI can be physically very close to each other, provided that they are separated by a gap to prevent thermal contact. The gap between layers can be ensured by using a very thin scrim or polyester mesh.

The shield 304 is advantageously supported on the strut using the MLI system 310. Fasteners are used to secure the MLI system 310 to the strut 302 and to secure the shield 304 to the MLI system 310. The fasteners which are used to secure the MLI system 310 to the strut 302 can be the same or different as compared to the fasteners used to secure the shield 304 to the MLI system 310. Any suitable fastener can be used for this purpose provided that it facilitates a secure attachment and is capable of withstanding the environmental conditions in which the system is utilized. For example, one or more of the fasteners can comprise an adhesive capable of securely bonding a portion of the MLI system 310 to the strut 302, and/or an adhesive capable of bonding the shield 304 to a portion of the MLI system 310. In some scenarios, the fasteners can include a double-sided tape which has pressure-sensitive adhesive exposed on both sides of a carrier web. The double-sided tape can facilitate bonding by positioning the double-sided tape between two opposing components (e.g., between the MLI system 310 and the strut 302 and/or between the MLI and the shield 304. Once positioned pressure can be applied to the elements facing the double-sided tape. The web-like carrier can be comprised of a thin film formed of a polymer material, a cloth layer, and/or a thick flexible foam layer.

In other scenarios, one or more of the fasteners can comprise a touch fastener. Touch fasteners comprise a class of fasteners including two opposing fastening elements. Touch fasteners can in some scenarios comprise hook-and-loop type fasteners or hook and pile type fasteners. Fasteners of this type are commercially available under the trade name Velcro®. In other scenarios the touch fasteners can comprise opposing fastening elements comprised of small rigid plastic stems which interlock. This type of fastener is commercially available under the trade name Dual Lock™ Reclosable Fasteners from The 3M Company of Saint Paul, MN. Various constructions of these touch fasteners are possible, and all are contemplated within the scope of the solution described herein. For space-based applications of the solution, the touch fasteners may in some scenarios be comprised of Teflon® loops, polyester hooks, and glass backing.

In the embodiment shown in FIGS. 3 and 4, touch fasteners are used to both secure the MLI to the strut, and to secure the shield to the MLI. In particular, touch fasteners 312, 314 are respectively comprised of fastening elements 316, 318 and 320, 322. The fastening elements 316, 318, 320, 322 can be comprised of elongated web strips or sections of various geometries such as squares, rectangles, or circles. The fastening elements 316, 318, 320, 322 can be secured on a first side thereof to the MLI, the strut and/or the shield using a suitable attachment method. The attachment method can include an adhesive, clips, threads and so on. In some scenarios, the first side of each fastening element can comprise a pressure sensitive adhesive to facilitate attachment of the fastening element to an opposing surface.

As best understood with reference to FIG. 4, a pressure sensitive adhesive 321 can be used to attach a first side of fastening element 320 to an interior surface 319 of the shield 304, and a pressure sensitive adhesive 323 can be used to attach a first side of fastening element 322 to an outermost surface 325 of the MLI 310. Similarly, a pressure sensitive adhesive 315 can be used to attach a first side of fastening element 316 to an outermost surface 303 of strut 302, and a pressure sensitive adhesive 317 can be used to attach a first side of fastening element 318 to an innermost surface of the MLI 310. A second side of each of the fastening elements 316, 318, 320, 322 will comprise a touch fastener type of attachment face configured so that when the two attachment faces of opposing adjacent fastening elements are pressed together, the faces removably fasten or bind to each other. For example, in some scenarios, the opposing attachment faces can comprise hook-and-loop type fastening structures or hook and pile type fastening structures. In other scenarios the opposing attachment faces can both be comprised of small rigid plastic stems which interlock when pressed together.

The fastening elements 316, 318 and 320, 322 can be disposed at one or more locations along the length of the strut 302. For example, in some scenarios, the fastening elements can be disposed at periodic or aperiodic intervals along a length of the strut 302. The purpose of these fastening elements is to maintain the shield 304 in a substantially fixed positional relationship relative to the strut 302. For example, in some scenarios the fastening elements can maintain a position of these two elements so that an elongated axis of the shield 304 is substantially concentric with the elongated axis of the strut 302. However, the solution is not limited in this regard and in some scenarios an axis defined by the elongated length of the strut 302 may be radially offset from a central axis defined by the elongated length of the shield 304.

Figure 5A:
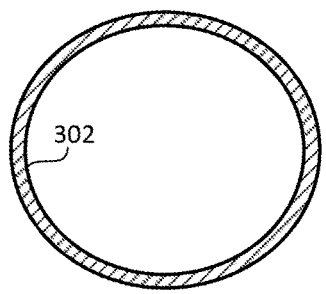
Figure 5B:
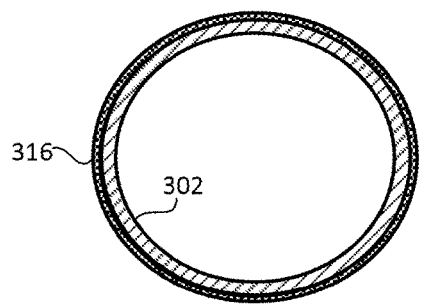
Figure 5C:
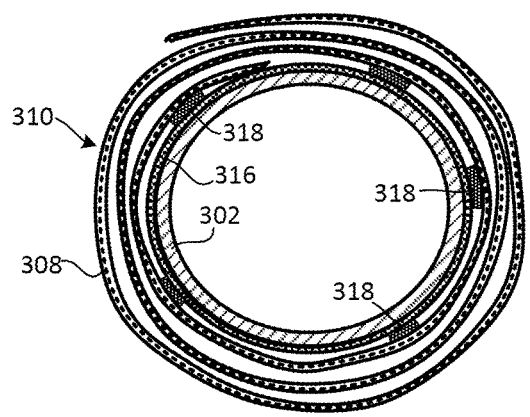
Figure 5D:
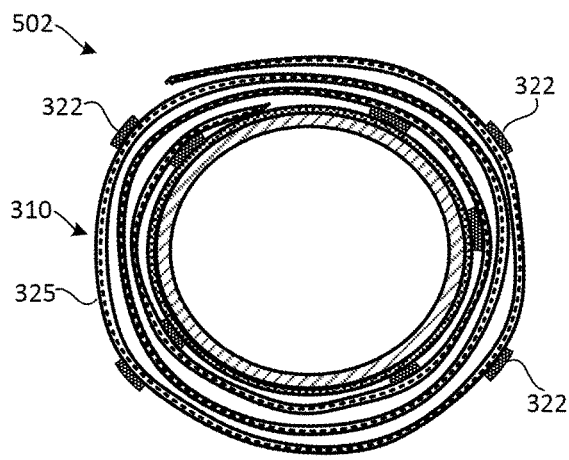

FIGS. 5A-5H are useful for understanding a method of providing a modular stray light mitigation system for a strut in an optical system. The method can begin with the strut 302 in the condition shown in FIG. 5A and continues to FIG. 5B where a fastening element 316 is secured to the outer surface of the strut. The process then continues to FIG. 5C in which one or more insulating layers 308 comprising the MLI 310 are secured to the strut 302 using the fastening elements 318. In some scenarios, the fastening elements 318 can be attached to the insulating layers 308 forming the MLI 310 before the insulating layers are wrapped around the strut 302. In other scenarios, the fastening elements 318 can be secured to an opposing fastening element 316, after which the insulating layers 308 can be attached to the fastening elements 318. Referring now to FIG. 5D, the fastening elements 322 are secured to the outermost surface 325 of the MLI 310 to form an insulated strut assembly 502. For example, these fastening elements 322 can be applied after the insulating layers 308 have been wrapped around the outer surface of the strut 302. In some scenarios, the fastening element can be pre-applied to the outermost surface 325 before the insulating layer 308 is wrapped around the strut 302.

Figure 5F:
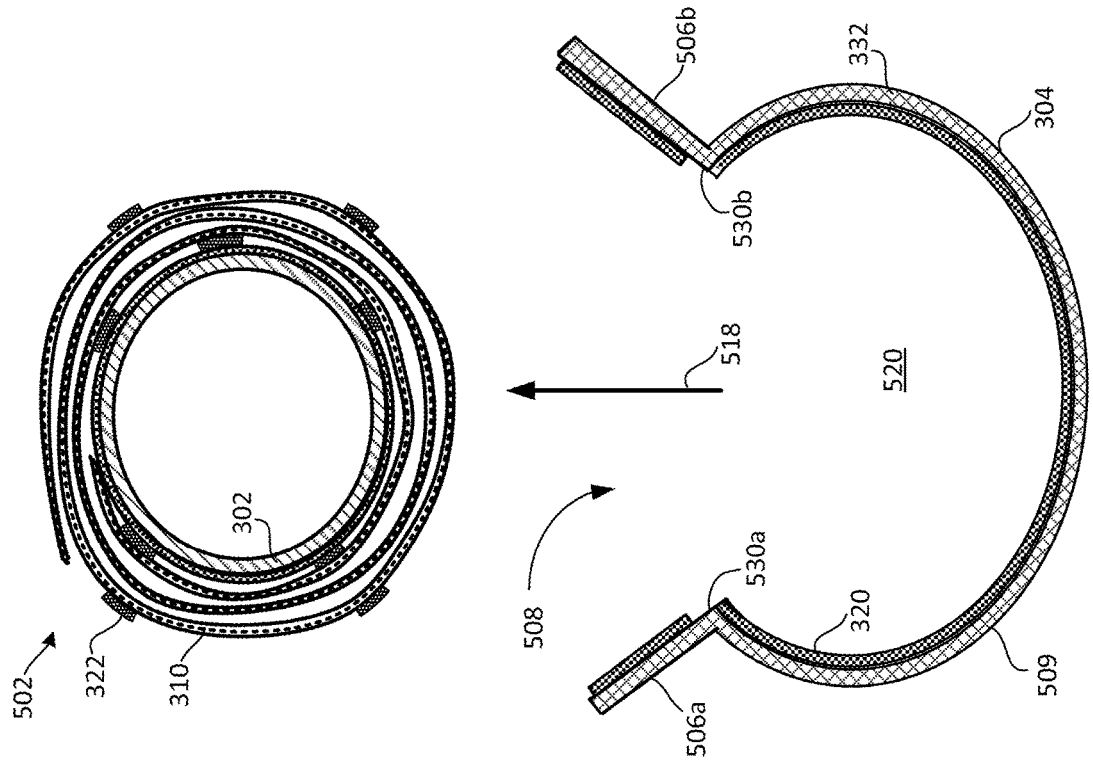
Figure 5E:
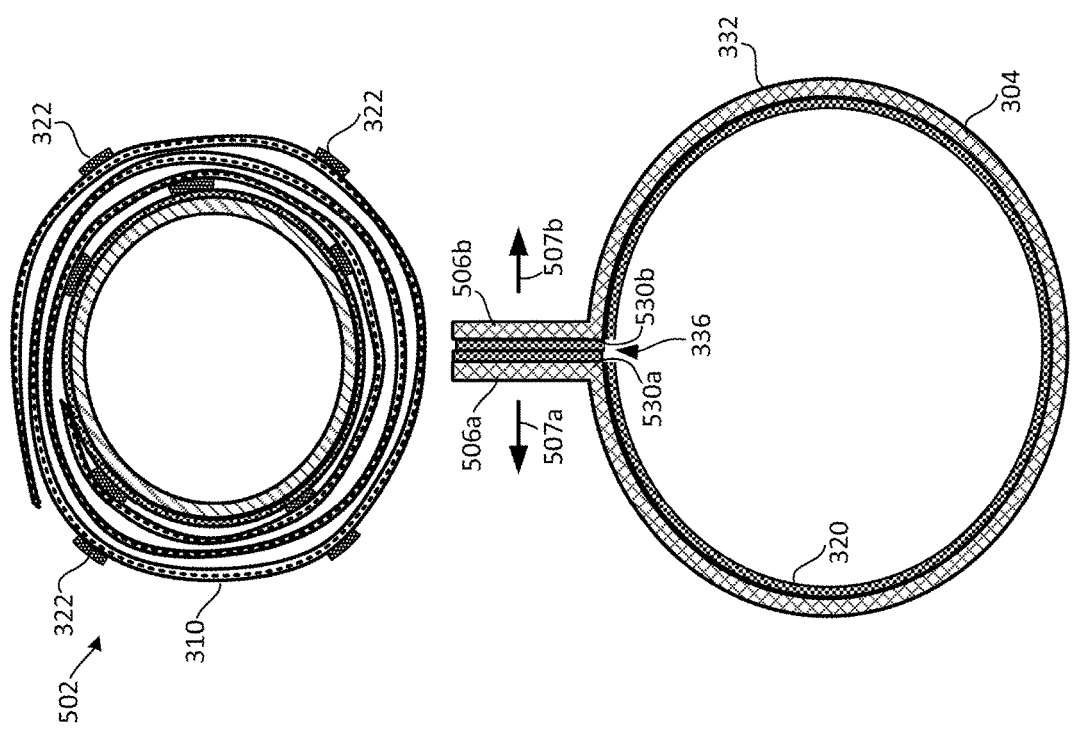

After the fastening elements 322 have been applied, the shield 304 can be installed around the insulated strut assembly 502. This assembly step may be understood with reference to FIGS. 5E-5H. In FIG. 5E the shield 304 is prepared for installation around the insulated strut assembly 502 by separating the closure tabs 506a, 506b along the slit 336 so as to form a gap 508 extending along an axial length of the shield between edges 530a, 530b of the shield wall 332. The closure tabs 506a, 506b can be separated by exerting a force on each closure tab in the directions indicated by arrows 507a, 507b in FIG. 5E. The shield 304 can be formed of a material which although rigid exhibits spring-like resiliency in certain configurations or geometries. For example, the shield wall 332 can flex as shown in the transition between FIG. 5e and FIG. 5F when a force is applied to the edges 530a, 530b in a direction indicated by arrows 507a, 507b. Suitable materials for forming the shield wall 332 can include sheet metal or a fiber reinforced plastic which allows the wall 509 of the shield to flex to a limited extent when the closure tabs 506a, 506b are separated. Other material types are also possible. The resulting gap 508 provides a space through which the shield can be positioned around the insulated strut assembly 502. This step is illustrated in FIGS. 5F and 5G which shows the shield 304 being moved in the direction of arrow 518 so that the strut is received into the enclosure space 520 defined by the tubular shaped shield 304.

After the shield is positioned around the insulated strut assembly 502, the forces 507a, 507b exerted on the closure tabs 506a, 506b can be released so that the tabs move in the directions of arrows 522a, 522b and the gap 508 is closed, as shown in FIGS. 5G and 5H. The closure of the gap 508 results in fastening elements 322 becoming attached to fastening elements 320. The closure tabs 506a, 506b can be secured to one another by any suitable means including adhesive, clips, double-sided tape or touch fastener. In the example shown in FIG. 5A-5H, touch fasteners 510a, 510b are used to secure the closure tabs.

Figure 6:
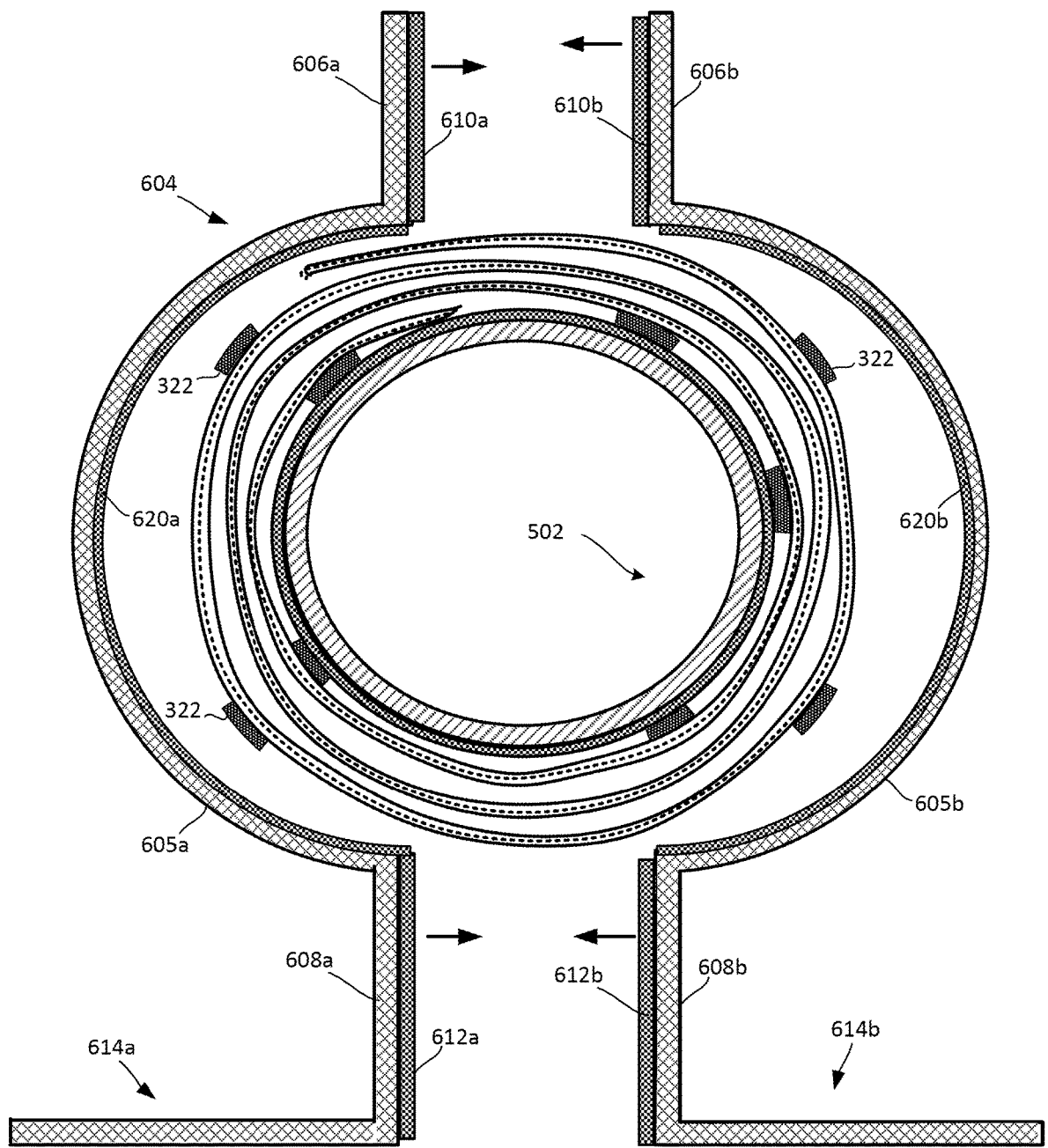
FIG. 6 is a cross-sectional view which is useful for understanding an alternative embodiment of a modular stray light mitigation system comprised of a plurality of semi-rigid shield parts.
Figure 7:
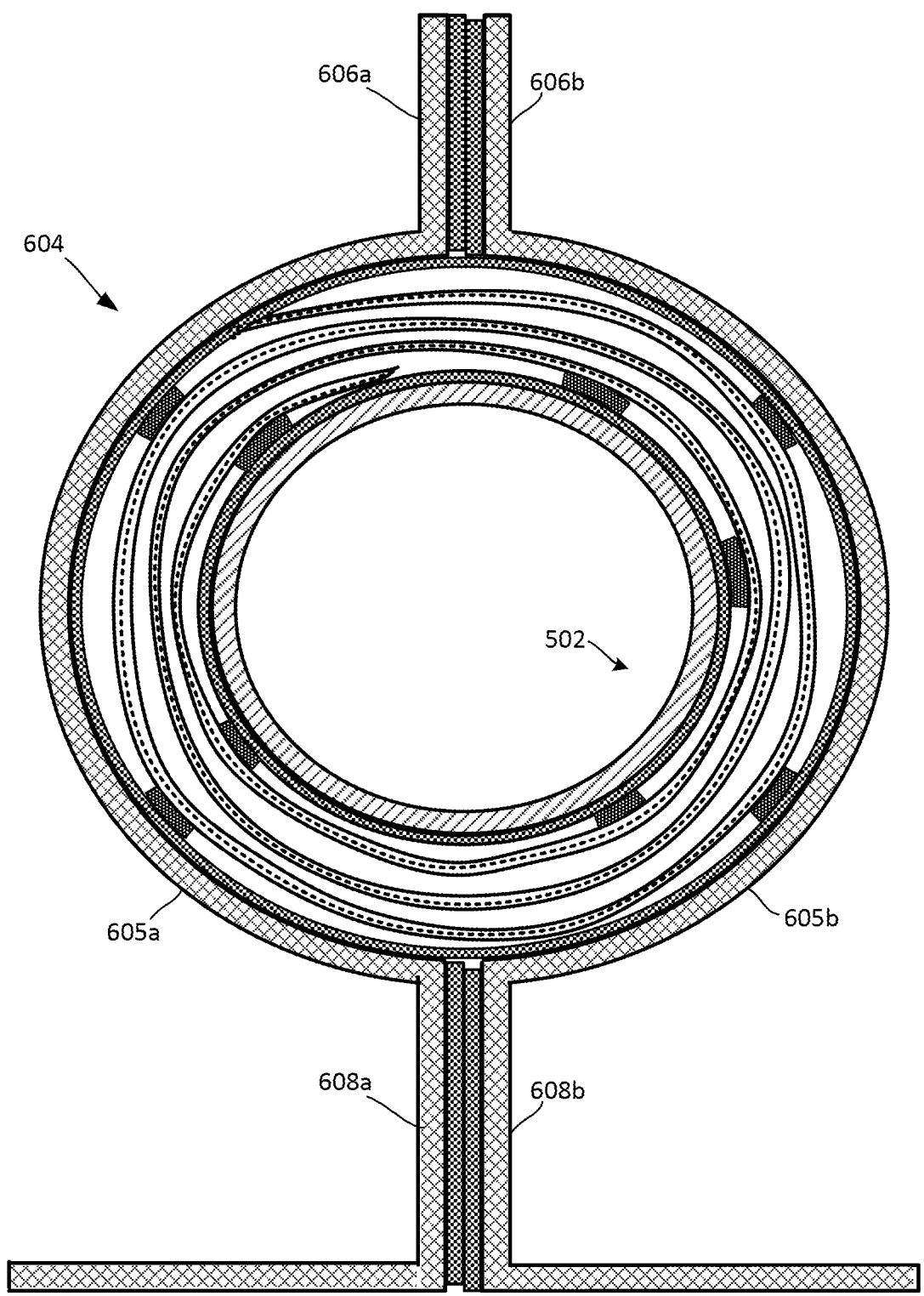
FIG. 7 is a cross-sectional view which is useful for understanding how the plurality of semi-rigid shield parts in FIG. 6 are secured around the strut.

The shield 304 shown in FIGS. 2-5 is formed of a tubular structure comprised of a singular member which can be flexed to form the axially aligned gap 508 when the closure tabs 506a, 506b are separated. However, it should be understood that embodiments of the solution disclosed herein are not limited in this regard. As an example, FIGS. 6-7 show a shield 604 having a two-piece configuration comprised of first and second shield members 605a, 605b. The shield 604 can be similar to shield 304 insofar as it can have one or more surface properties facilitated by a surface finish which causes the shield to be highly absorptive and/or minimize reflected electromagnetic radiation within the optical spectrum.

The shield 604 is disposed around an insulated strut assembly 502. The shield members 605a, 605b can be positioned around the insulated strut assembly as shown in FIG. 6. The shield members can then be applied around the insulated strut assembly and secured together at closure tabs 606a, 606b and 608a, 608b using fastening elements (e.g., fastening elements 610a, 610b and 612a, 612b). The shield members 605a, 605b can also include touch fastener type fastening elements 620a, 620b which are capable of being attaching to fastening elements 322.

Figure 8:
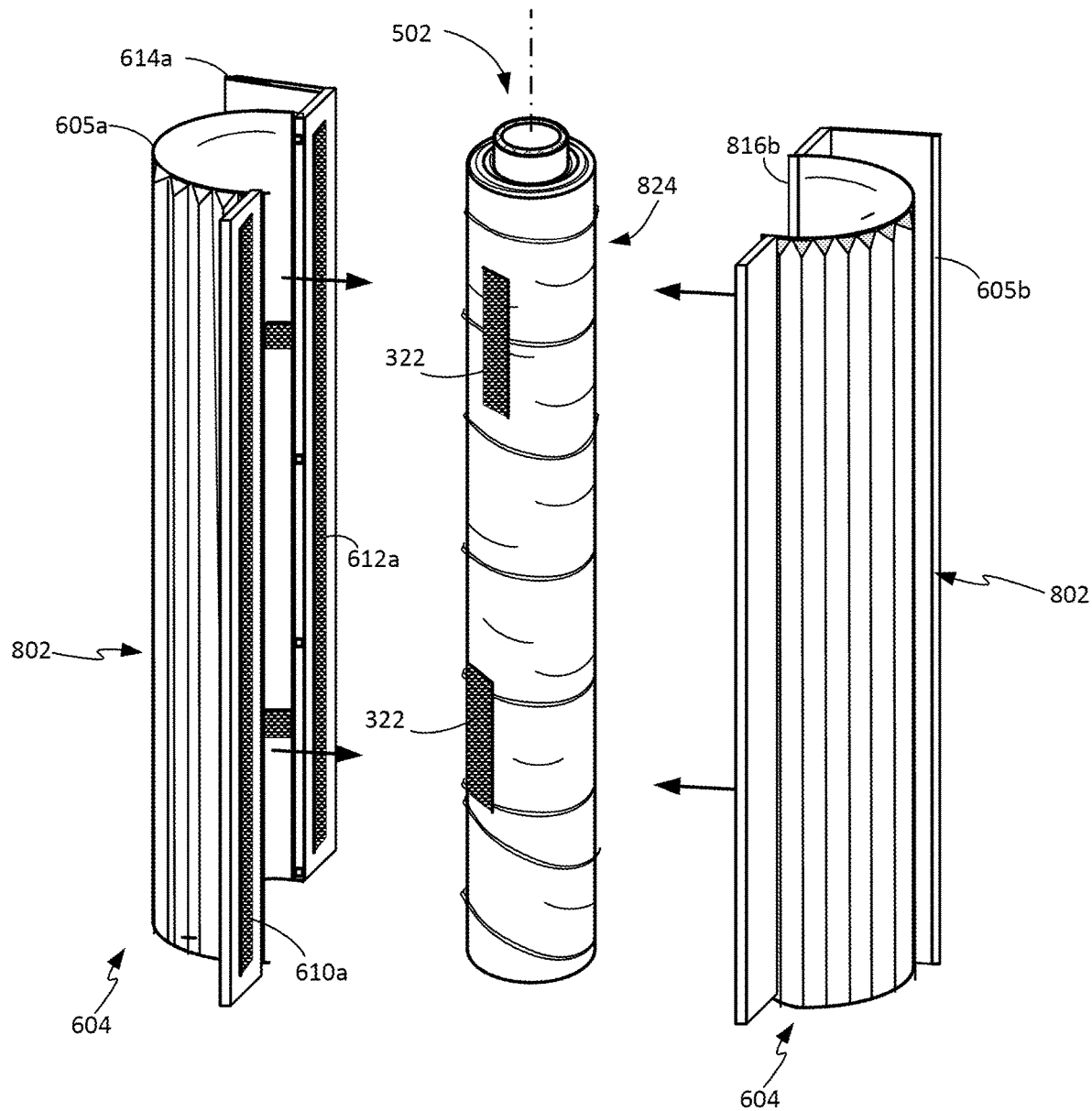
FIG. 8 is a perspective view showing a method of installing a plurality of semi-rigid shield parts in a modular stray light mitigation system where the shield parts include a corrugated outer surface.

In some scenarios, the shield member 304, 604 can include integrated structure which is intended to reduce the occurrence of stray light. For example, the shield member 604 is shown as including integrated structure 614a, 614b which forms a light scraper. A similar light scraper structure could be included with shield member 304. An alternative embodiment of the shield 604 is shown in FIG. 8 in which each of the shield members 605a, 605b can have a surface structure 802 configured to reduce reflections of stray light. In this example a corrugated surface structure is shown, but the solution is not limited in this regard and any other suitable surface structure can be employed to reduce reflections of stray light.

The insulated strut assembly 502 shown in FIGS. 2-8 includes a strut having a generally circular or elliptical shaped cross-sectional profile shape, and a shield having a similar circular or elliptical cross-sectional profile shape. However, the solution is not limited in this regard and the shielded strut configuration as described allows a wide variation in cross-sectional profile shape of the strut and the shield. Any suitable combination of strut 302 and shield 304 can be used to facilitate a particular design. Other examples of possible cross-sectional shape combinations for the strut/shield include circular/square, trapezoidal/square, square/square, elliptical/circular, trapezoidal/circular, and square/circular. The foregoing are merely presented as example configurations and the solution is not intended to be limited in this regard.

Figure 9:
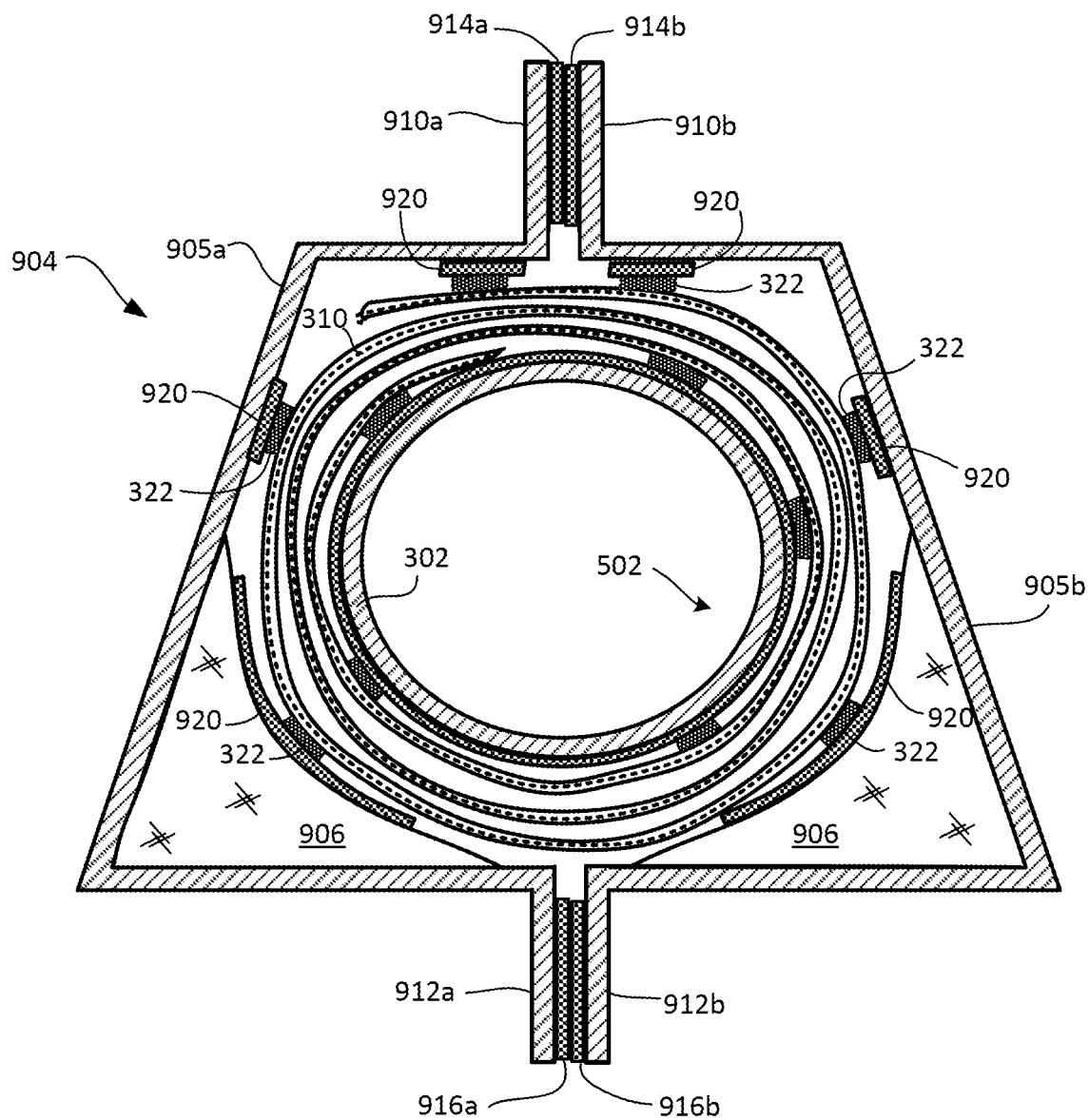
FIG. 9 is a cross-sectional view which shows how a shield can have a different cross-sectional profile as compared to the strut.

FIG. 9 shows a scenario in which the strut 302 has a circular or elliptical cross-sectional shape and the shield 904 has a trapezoidal shape. The shield 904 can have one or more surface properties facilitated by a surface finish which causes the shield to be highly absorptive and/or minimize reflected electromagnetic radiation within the optical spectrum. The shield 904 in this example is a two-part assembly comprised of shield members 905a, 905b which are secured together at closure tabs 910a, 910b and 912a, 912b using fastening elements (e.g., fastening elements 914a, 914b and 916a, 916b). When the strut cross-sectional shape is different as compared to the shield, it can be advantageous to include one or more positioning members 906 within the interior of the shield. The positioning member 906 can be formed of the same or a different material as compared to the shield.

The exact shape and size of the positioning member 906 will depend upon the shape of the particular strut and/or shield involved in a particular application. However, in some scenarios, it can be advantageous to contour the positioning member so that it matches a contour of the shield and/or the insulated strut assembly. In some scenarios, the positioning members 906 can be integrally formed with the shield but in other scenarios the positioning members may be attached to the shield by suitable means (e.g., adhesive, touch fasteners, clips and so on).

As may be understood with reference to FIG. 9, the positioning members 906 can serve several purposes. For example, the positioning members 906 can facilitate proper positioning of the shield around the insulated strut assembly. The positioning members 906 can also support the fastening elements (e.g., fastening elements 322 and 920) in locations where they are needed. Proper positioning and support can help to ensure the attachment of the fastening elements to one another when the shield is applied to the insulated strut assembly.

The modular stray light mitigation system described herein has several advantages in a metering structure. One advantage is that the system can be easily integrated with struts comprising a metering structure late in the design process and/or may be added to existing designs of metering structures to address stray light issues that are discovered after the design is complete. A further advantage is the decoupling of the cross-sectional shape of the shield from the cross-sectional shape of the strut. This allows a designer to optimize the cross-sectional profile shape of the strut for satisfying the structural support requirements of a particular metering structure while also optimizing the cross-sectional shape of the shield for reducing the amount of stray light that is reflected toward one or more optical elements of an optical sensor system.

The shield attachment system and methodology described herein can help provide a predetermined space between the outer surface of the strut and the inner surface of the shield. Further, the use of the MLI as an intermediate fastening element between the shield and the strut can help ensure that the thermal deformation of the shield is well isolated from the strut. It will be understood that such dynamic dimensional variation in the strut and/or shield can occur as a result of temperature differences and mismatched CTE as between the strut and the shield. In this regard, the flexible material of the insulating layers comprising the MLI can allow some thermal deformation of the shield to occur without direct coupling of deformation forces to the strut. The fastening elements can be similarly chosen to allow for some deformation or movement of the shield relative to the strut. Touch fasteners as described herein can be well suited for this purpose. In some scenarios, the fastening elements can be comprised of materials which, like the MLI, will minimize overall thermal conductance between the strut and the shield.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for mitigating stray light in an optical metering system, comprising:

disposing a plurality of web layers of a multi-layer insulation (MLI) system around an elongated length of a strut of an optical metering system to form an insulated strut assembly, wherein the MLI system is configured to control transfer of thermal energy;

securing the MLI system to the strut using a plurality of first fasteners;

enclosing the insulated strut assembly along the elongated length with a shield formed of a semi-rigid material and having a shield length that is coextensive with the elongated length;

securing the shield to the MLI system using a plurality of second fasteners; and providing the shield with a surface finish that is highly absorptive of electromagnetic radiation in the optical spectrum and disposed on an exterior surface of the shield along the shield length.

2. The method of claim 1, further comprising selecting the plurality of first fasteners to be a first fastener type from the group consisting of an adhesive, a clip, a double sided tape, and a touch fastener.

3. The method of claim 2, further comprising selecting the plurality of second fasteners to be a second fastener type from the group consisting of an adhesive, a clip, a double sided tape, and a touch fastener.

4. The method of claim 3, further comprising selecting the first fasteners and the second fasteners type to be of the same fastener type.

5. The method of claim 1, further comprising disposing the plurality of web layers of the MLI system coextensive with the shield length.

6. The method of claim 1, further comprising selecting a cross-sectional profile shape of the shield to be a different shape as compared to a cross-sectional profile shape of the strut.

7. The method of claim 4, further comprising selecting the cross-sectional profile shape of the shield to facilitate a reduced amount of reflected stray electromagnetic radiation in the optical spectrum as compared to the cross-sectional profile shape of the strut.

8. The method of claim 1, further comprising distributing the plurality of first fasteners at a plurality of spaced apart locations along the elongated length of the strut.

9. The method of claim 1, further comprising when the shield is enclosing the strut, using one or more of the first fasteners, the second fasteners, and the MLI to facilitate an allowable dynamic dimensional variation of the strut relative to the shield caused by a coefficient of thermal expansion (CTE) mismatch as between the shield and the strut.

10. The method of claim 1, further comprising absorbing in one or more of the first fasteners, the second fasteners, and the MLI mechanical stresses caused by a dynamic dimensional variation of the shield relative to the strut.

11. The method of claim 1, wherein the shield is comprised of a tubular member having a slit extending along the shield length between two opposing shield wall edges, and the method further comprises separating the opposing shield wall edges along the slit to form a gap.

12. The method of claim 11, further comprising positioning the shield around the strut by passing the strut through the gap and then closing the gap.

13. The method of claim 12, further comprising at least a third fastener configured to secure a first one of the shield wall edges to a second one of the shield wall edges opposed from the first shield wall edge to maintain the gap in a closed state.

14. The method of claim 1, wherein the shield is comprised of a tubular member formed of a plurality of shield members which divide the shield along the shield length, and the method further comprises enclosing the strut along the shield length by positioning at least a first one of the shield members along a first side of the strut, positioning at least a second one of the shield members along a second side of the strut, and securing the first one of the shield members to at least the second of the shield members.

15. The method of claim 1, further comprising forming the surface finish as a coating comprised of carbon nanotubes.

16. The method of claim 1, further comprising providing a surface structure on an outer surface of the shield which is configured to reduce reflections of stray electromagnetic radiation in the optical spectrum.

\* \* \* \* \*